(12) United States Patent
Nozu et al.

(10) Patent No.: US 8,411,255 B2
(45) Date of Patent: Apr. 2, 2013

(54) PATTERN FORMING METHOD

(75) Inventors: Kyota Nozu, Atsugi (JP); Ryoji Kondo, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 442 days.

(21) Appl. No.: 12/769,926

(22) Filed: Apr. 29, 2010

(65) Prior Publication Data

US 2010/0283987 A1  Nov. 11, 2010

(30) Foreign Application Priority Data

May 11, 2009  (JP) .................................. 2009-114381

(51) Int. Cl.
*G03B 27/32* (2006.01)
*G03B 27/54* (2006.01)
(52) U.S. Cl. .......................................... 355/77; 355/67
(58) Field of Classification Search ...................... 355/77
See application file for complete search history.

(56) References Cited

U.S. PATENT DOCUMENTS 6,042,998 A * 3/2000 Brueck et al. .................. 430/316
2004/0156029 A1* 8/2004 Hansen ............................ 355/67

FOREIGN PATENT DOCUMENTS

JP  2002-287324 A  3/2002

* cited by examiner

*Primary Examiner* — Minh-Toan Ton
*Assistant Examiner* — Michelle Iacoletti
(74) *Attorney, Agent, or Firm* — Fitzpatrick, Cella, Harper & Scinto

(57) ABSTRACT

A method of forming a pattern with dots or holes arranged in a two-dimensional period by illuminating, with illumination light, a mask having a light-shielding portion pattern on a translucent substrate, and performing projection and exposure of an object to be exposed through a projection optical system. The illumination light is an effective light source of multipole illumination. A first exposure process is performed with the mask placed at a first position relative to the object to be exposed, and a second exposure process is performed with the mask placed at a second position. The mask has line patterns having lines with a line width a [m] arranged in parallel at a pitch of P. The line patterns are arranged in a mesh such that the line patterns intersect one another at 60° in three directions, and the illumination light is an effective light source of hexapole illumination. The second exposure process is performed, after the first exposure process, with the mask placed at a second position displaced from the first position by 2P/3 [m] in a direction perpendicular to any line of the line patterns. A third exposure process is performed, after the second exposure process, with the mask placed at a third position further displaced from the second position by 2P/3 [m] in the direction, to thereby form a dot pattern in a two-dimensional period having a pitch of P/3 [m].

3 Claims, 10 Drawing Sheets

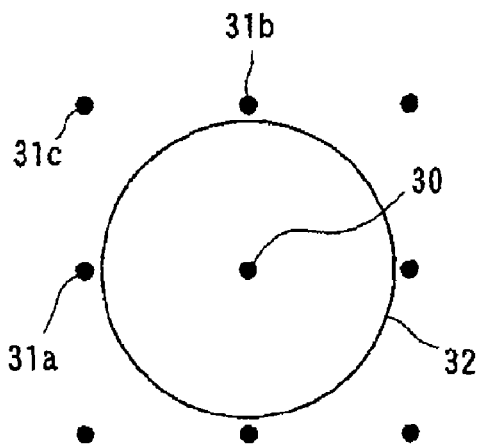
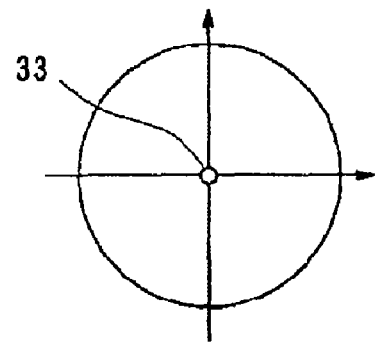
FIG. 3A    FIG. 3B
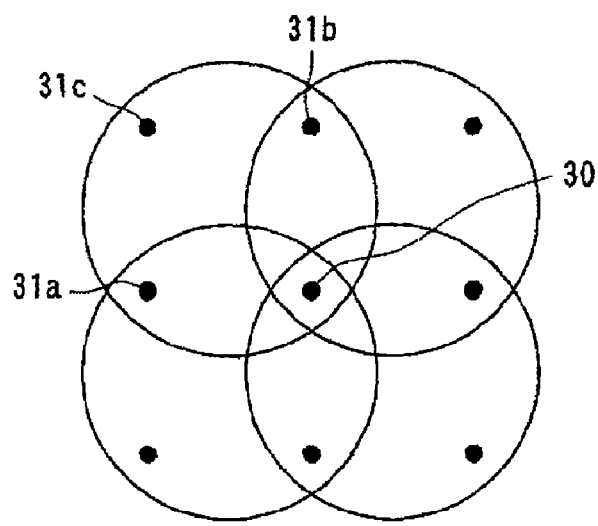
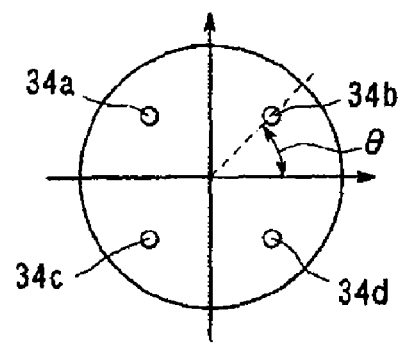
FIG. 3C    FIG. 3D
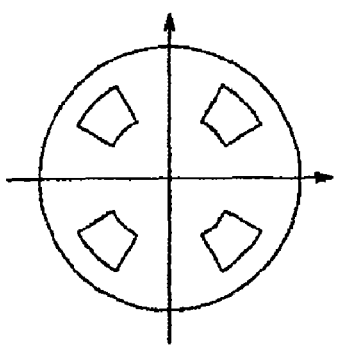
FIG. 3E

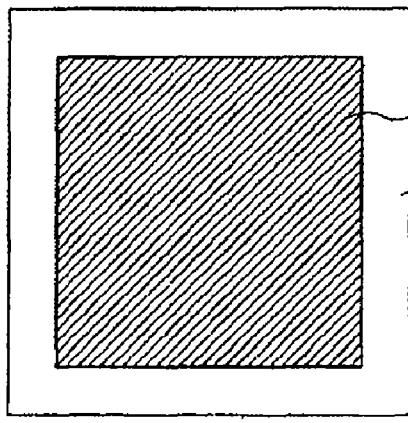
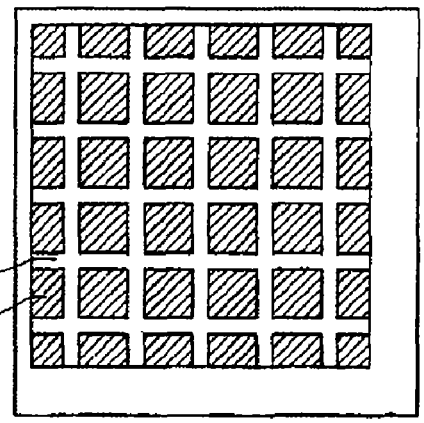
FIG. 4A     FIG. 4B
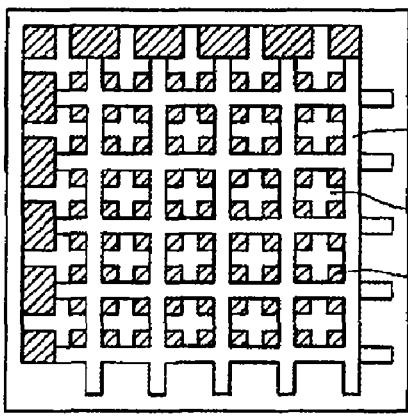
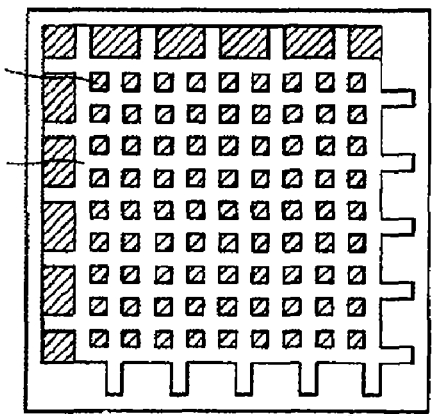
FIG. 4C     FIG. 4D
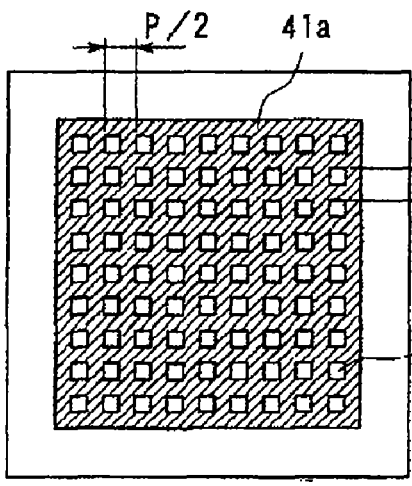
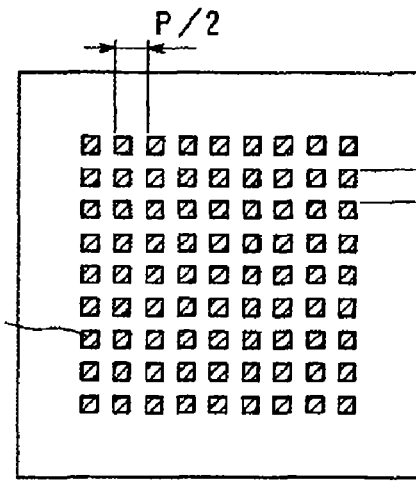
FIG. 4E     FIG. 4F

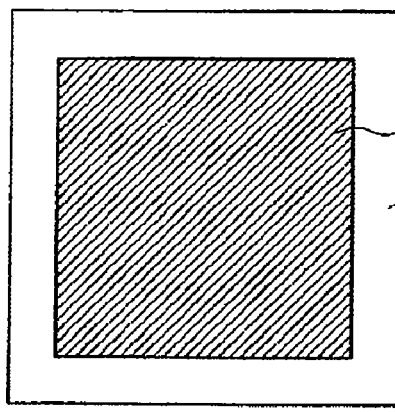
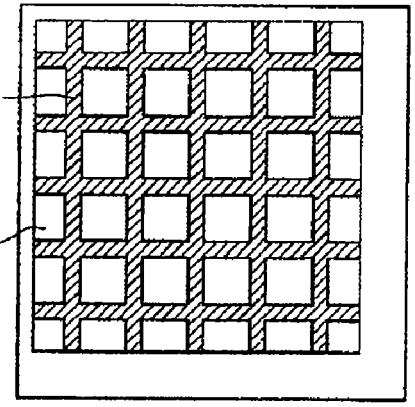
FIG. 5A  FIG. 5B
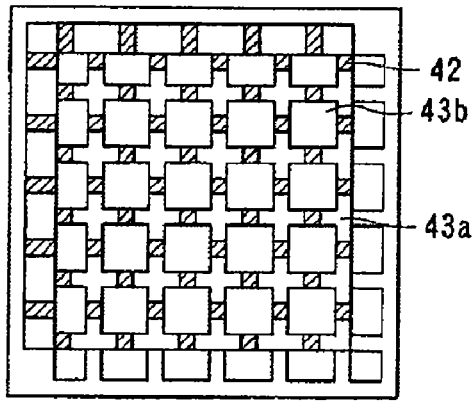
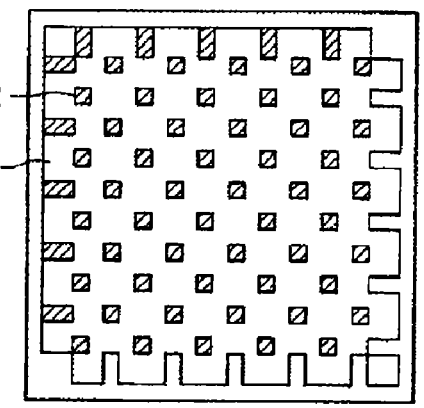
FIG. 5C  FIG. 5D
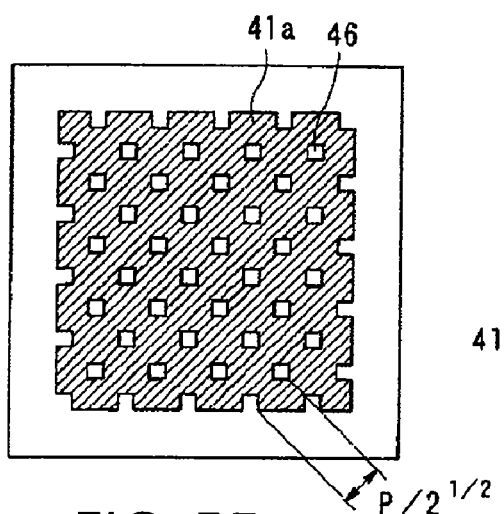
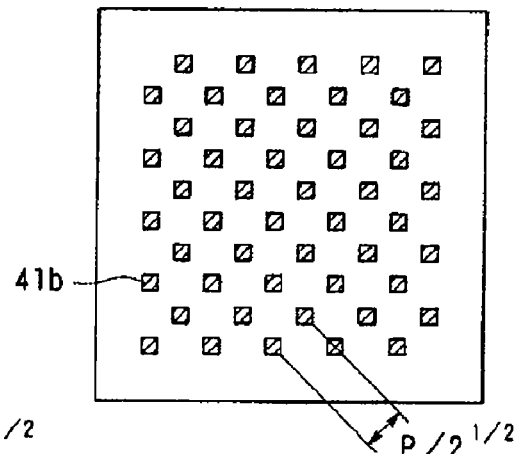
FIG. 5E  FIG. 5F

PATTERN FORMING METHOD

CLAIM FOR PRIORITY

This application claims the benefit of Japanese Patent Application No. 2009-114381, filed on May 11, 2009, which is hereby incorporated by reference herein in its entirety.

BACKGROUND OF THE INVENTION

1. Field of Invention

The present invention relates to an exposure transfer technique of a circuit pattern of a semiconductor integrated circuit, a flat-panel display (FPD), or the like, and more particularly, to a pattern forming technique of arranging dots or holes in a two-dimensional period.

2. Description of the Related Art

In recent years, miniaturization of a large scale integrated circuit (LSI) implemented by using semiconductors has been proceeding. As a result, in a lithography process, one of LSI manufacturing processes, pattern sizes have been miniaturized to the proximity of the resolution limit that is defined from the wavelength of a light source of an exposure device and the numerical aperture (NA) of a lens. A hole pitch (i.e., a distance between the centers of adjacent holes) in a hole pattern is closely related to a wiring pitch (i.e., a distance between the centers of a pair of adjacent wires), and, therefore, is largely linked to the pattern density. Accordingly, further miniaturization is demanded. As a method of forming such a narrow-pitched hole pattern, Japanese Patent Application Laid-Open No. 2002-287324, for example, proposes an exposure method by means of double exposure that uses a half-tone type phase shift mask and a normal photomask.

SUMMARY OF THE INVENTION

The method disclosed in Japanese Patent Application Laid-Open No. 2002-287324 mentioned above, however, involves defects in that a half-tone type phase shift mask, which is at a high cost, needs to be used, and mask replacement is required, which affects the accuracy of overlay, such that an increase in tact corresponding to mask replacement occurs.

The invention is directed to overcome the foregoing defects. An object of the invention is to provide a method of forming a pattern in which dots or holes are arranged in a two-dimensional period at a narrow pitch, at a low cost, with tact saving and high positional accuracy, by using an inexpensive binary mask.

A pattern forming method according to this invention is a method of forming a pattern with dots or holes arranged in a two-dimensional period by illuminating, with illumination light, a mask having a light-shielding portion pattern on a translucent substrate, and, performing projection and exposure of an object to be exposed through a projection optical system, wherein the illumination light is an effective light source of multipole illumination, and the method comprising the steps of:

performing a first exposure process with the mask placed at a first position relative to the object to be exposed, and performing a second exposure process with the mask placed at a second position different from the first position relative to the object to be exposed.

This invention includes the following arrangements as a preferred aspect.

The mask has line patterns with a line width of a [m] arranged in a grid in XY directions at a pitch of P [m], the illumination light is an effective light source of quadrupole illumination, and the line patterns are displaced between the first position and the second position P/2 [m] in the X direction and P/2 [m] in the Y direction to form a pattern in a two-dimensional period having a pitch of P/2 [m].

The mask has line patterns having lines with a line width of a [m] in parallel at a pitch of P, the line patterns being arranged in a mesh such that the line patterns intersect one another at 60° in three directions, and, the illumination light is an effective light source of hexapole illumination, wherein the second exposure process is performed after the first exposure process, with the mask placed at a second position displaced from the first position by 2P/3 [m] in a direction perpendicular to any line of the line patterns, and, after the second exposure process, a third exposure process is performed with the mask placed at a third position further displaced from the second position by 2P/3 [m] in the direction, thereby, a dot pattern in a two-dimensional period having a pitch of P/3 [m] is formed.

The line patterns are opening portion patterns.

The mask has a first area having light-shielding portions arranged at a pitch of P [m] so as to obliquely intersect, and a second area having opening portions arranged at the pitch of P [m] so as to obliquely intersect, the illumination light is an effective light source of hexapole illumination, in the first exposure process, exposure is performed using the first area of the mask, and in the second exposure process, exposure is performed with the second area of the mask arranged such that the light-shielding portions in the first exposure process are overlapped with the opening portions of the second area.

According to the invention, in a plurality of exposure processes, it is possible to easily perform multiple exposure and multiple patterning merely by shifting the position of one mask. This enables a pattern in a fine two-dimensional period to be provided with good accuracy through simplified processes.

Further features of the present invention will become apparent from the following description of exemplary embodiments, with reference to the attached drawings.

BRIEF DESCRIPTION OF THE DRAWINGS

FIGS. 3A to 3E illustrate illumination used in the invention, and diffracted light patterns of the illumination;

FIGS. 4A to 4F illustrate exposure processes of an embodiment of the invention;

FIGS. 5A to 5F illustrate exposure processes of another embodiment of the invention;

DESCRIPTION OF THE EMBODIMENTS

The present invention is a method of forming a pattern in which dots or holes are arranged in a two-dimensional period, and is characterized by performing exposure of an object to be exposed a plurality of times by using illumination light with an effective light source of multipole illumination, while shifting the position of a mask relative to the object to be exposed every time exposure is performed.

Figure 1:
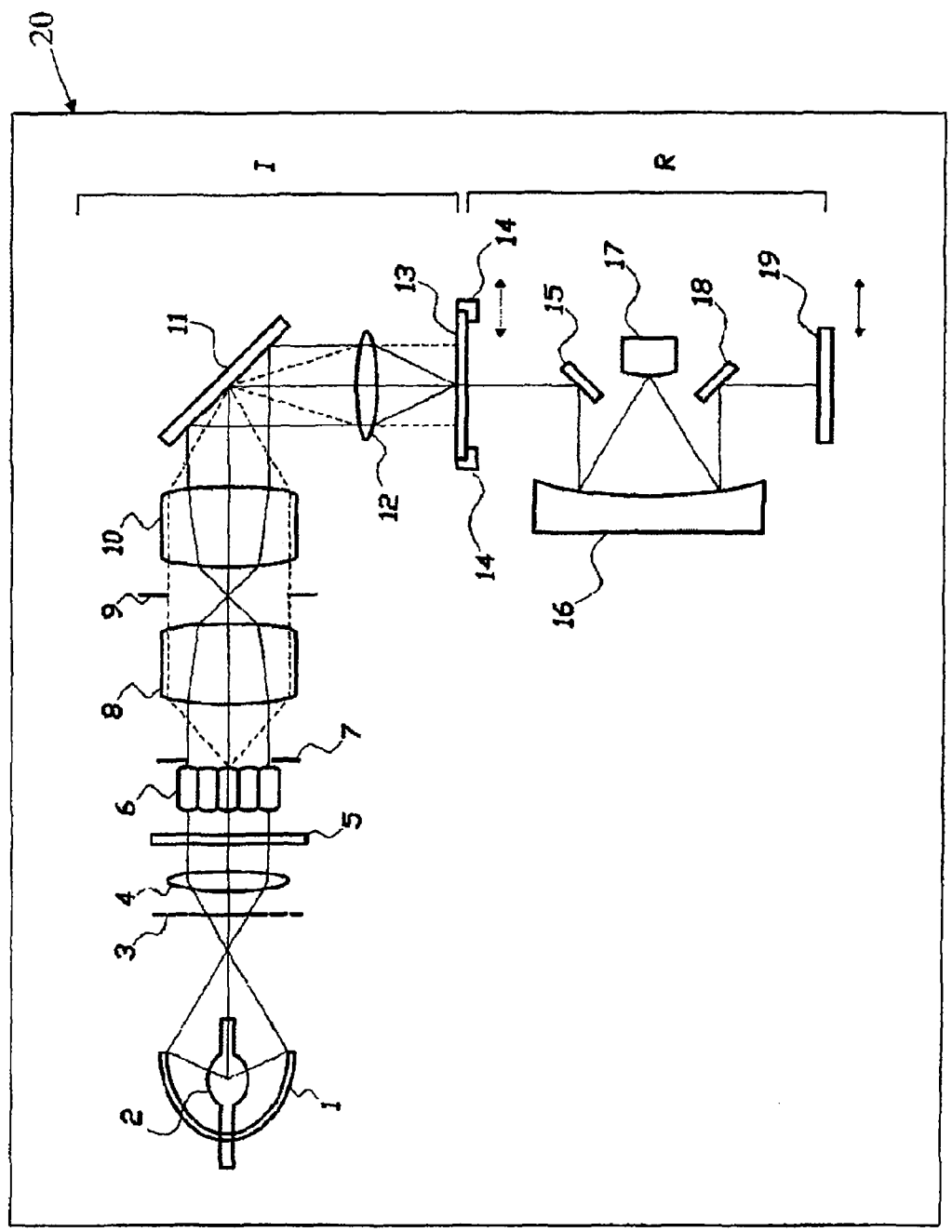
FIG. 1 is a schematic view illustrating a configuration of an exposure device used in the invention.

First, an exposure device used in the invention is described with reference to FIG. 1. FIG. 1 is a schematic view of the main part of a scanning projection aligner using a one-to-one mirror optical system. A projection aligner illustrated in FIG. 1 includes a reflection projection optical system R and an illumination system I, which includes a relay system (a stop imaging lens system), and which forms an arcuate or a fan-shaped illumination region on a mask 13. The projection optical system R includes a concave mirror 16, a convex mirror 17, and mirrors 15 and 18. The relay system includes a mercury lamp light source 2, an elliptical mirror 1, a shutter 3, first and second condenser lenses 4 and 8, a wavelength filter 5, an integrator 6, a stop 7, a field stop 9 having an arcuate or a fan-shaped aperture, first and second relay lenses 10 and 12, and a mirror 11.

In the projection aligner 20, a Koehler illumination system is included, which is arranged such that a secondary light source plane formed by the integrator 6 is approximately coincident with the front focal point of the second condenser lens 8, and the field stop 9 is approximately coincident with the back focal point of the second condenser lens 8. The mask 13 is arranged in the object plane of the projection optical system R, and is moved in synchronization with a substrate 19 arranged in the image plane. The mask 13 and the substrate 19 are scanned with light in the object plane and in the image plane, respectively, in the directions of the arrows of FIG. 1, so that a pattern formed on the mask 13 is transferred onto the substrate 19. The illumination system I is required to uniformly and efficiently illuminate the entire effective image region (typically, arcuate or fan-shaped) of the projection optical system R, on the mask 13, with a given numerical aperture. To meet the requirement, cylindrical fly-eye lenses are used as the integrator, and an illumination flux from each cylindrical lens is superposed on the field stop 9, thereby, temporarily creating a rectangular area illuminated without illuminance unevenness. An image of the illumination fluxes that have passed through an arcuate or a fan-shaped slit (aperture) formed in the field stop 9 is formed on the mask 13 by means of the relay systems (stop imaging system) 10 to 12. Illumination, which is in a desired arcuate or fan-shaped form and whose illuminance is uniform at all points in an area being illuminated, is thereby obtained.

Figure 2A:
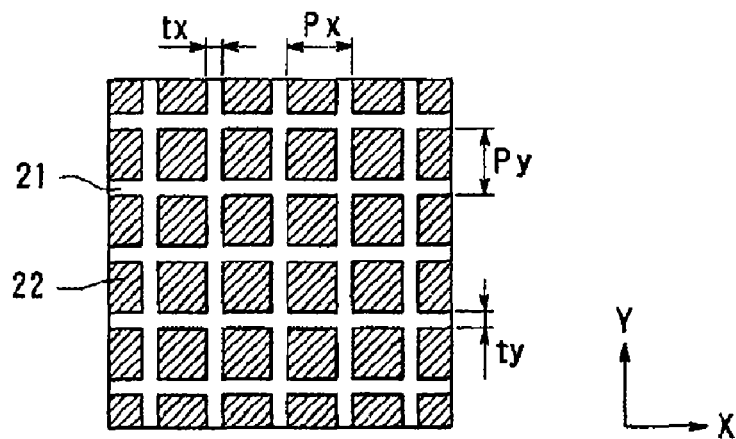
FIGS. 2A and 2B are plan views illustrating an example of a mask used in the invention.
Figure 2B:
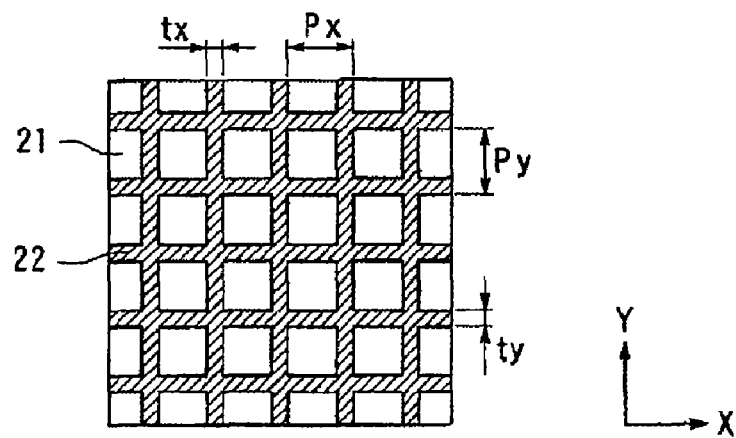

FIGS. 2A and 2B are plan views of the mask 13 used in the invention. A mask used in the invention has a light-shielding portion pattern on a translucent substrate. In FIGS. 2A and 2B, reference numeral 21 denotes opening portions, and reference numeral 22 denotes light-shielding portions. Illustrated in FIG. 2A is a mask in which the opening portions 21 form line patterns, and illustrated in FIG. 2B is a mask in which the light-shielding portions 22 form line patterns. Preferably, in the invention, the mask of FIG. 2A, in which line patterns are opening portion patterns, is used. In FIGS. 2A and 2B, line patterns formed of the opening portions 21 and the light-shielding portions 22 are arranged periodically in X and Y directions, where the pitch in the X direction is Px and the pitch in the Y direction is Py. Assuming that the width of a line extending in the Y direction is tx [m] and the width of a line extending in the X direction is ty [m], the following rotations are preferably satisfied: $tx=ty=a$ [m] and $Px=Py=P$ [m]. Selecting an optimum shape of an effective light source for such a mask allows a two-dimensional periodic pattern for high resolution to be formed on the substrate 19. Details thereof are described below.

FIG. 3A illustrates a diffracted light pattern on a pupil plane in a case when the mask 13 illustrated in FIGS. 2A and 2B is illuminated by means of small $-\sigma$ illumination, as illustrated in FIG. 3B. In FIGS. 3A to 3E, a circle 32 is a pupil of the projection optical system R. FIG. 3B is a schematic view illustrating a case when the numerical aperture (NA) of the illumination optical system I is equal to the NA of the projection optical system R, namely, $\sigma=1.0$, and when a point light source 33 of $\sigma$ 0.0 is arranged at the center of illumination. In such small $-\sigma$ illumination, as illustrated in FIG. 3A, for zero-order diffracted light 30, first-order diffracted light 31a is produced according to an X-direction fundamental period of a mask pattern, and first order diffracted light 31b is produced according to a Y-direction fundamental period. The position of the first-order diffracted light 31 is $\pm\lambda/Px$, assuming that the wavelength of the light source is $\lambda$ [μm], and likewise, the position of the first-order diffracted light 31b is $\pm\lambda/Py$. Therefore, as the positions Px and Py decrease, that is, the pattern pitch becomes narrower, diffracted light intervals increase. As a result, first-order diffracted light is not contained in the pupil 32, and, therefore, no image is formed on the substrate 19. However, quadrupole illumination with point light sources 34a, 34b, 34c and 34d, as illustrated in FIG. 3D, allows the zero-order diffracted light 30 and three beams of first-order diffracted light 31a, 31b and 31c to be simultaneously incident upon the pupil, as illustrated in FIG. 3C. That is, four-beam interference causes a two-dimensional periodic bright and dark image to be formed in a grid pattern. The shapes of effective light sources may be, in addition to circular shapes, as illustrated in FIG. 3D, arcuate shapes, as illustrated in FIG. 3E. The shapes are not limited, but are preferably symmetric around the center of four light source positions.

Next, exposure processing utilizing the exposure device 20 is described. First, as illustrated in FIG. 4A, a substrate 40 coated with a resist 41 is manufactured. Next, first exposure, as illustrated in FIG. 4B, is performed using a mask illustrated in FIG. 2A and an optimum effective light source shape illustrated in FIG. 3D. Assume that tx=ty and Px=Py=P in this embodiment. The position of the mask at this point is a first position, a portion exposed at this point is an area denoted by reference character 43a, and reference character 42 denotes a light-shielding area. Next, using the same mask and the same light source, the mask is shifted to a second position that is apart from the first position by a given amount, as illustrated in FIG. 4C, and second exposure is performed. Reference character 43b in FIG. 4C denotes an area exposed in the second exposure. As a result, areas denoted by reference character 43 are all exposed areas in FIG. 4D, and reference character 42 denotes a light-shielding area. The amount of shift of a mask varies from mask to mask. For a mask illustrated in FIG. 2A, the shift amounts in the X direction and in the Y direction are each P/2 and, as a result, a pattern with pitches of P/2 both in the X direction and in the Y direction is obtained. Note that, in cases when the resist 41 is of a negative type, a resist pattern 41a of FIG. 4E is left to form a hole pattern in which holes 46 are arranged in a two-dimensional period of a pitch of P/2. Alternatively, in cases when the resist 41 is of a positive type, a dot-shaped resist pattern in a two-dimensional period denoted by reference character 41b in FIG. 4F is formed.

The manner in which a mask is shifted is not limited to the above-mentioned example, a positional relationship between a first exposure image and a second exposure image may be such that the center of a cross of a portion exposed to the second exposure is positioned at the center of a portion not exposed to the first exposure, as shown in FIG. 4C. Both the amount and the direction of shifting may, therefore, have any values. The shifting method includes shifting a mask stage and shifting a substrate stage, either of which may be used alone, or both of which may be used in combination with each other.

In such shift exposure processing, there are two types of methods, a multiple exposure method and a multiple patterning method. In the multiple exposure method, after a first exposure process, a mask is moved and, subsequently, a second exposure process is performed, and finally, development is performed with an alkali developer. In the multiple patterning method, after a first exposure process, development is performed once, and etching is performed by using a resist as a mask, and then, the resist is stripped. Further, a resist is newly applied, and then, the mask is moved, and a second exposure process and development are performed. Processes illustrated in FIGS. 4A to 4F are in a double exposure method. The processes may be performed by either of these methods. It is, however, preferable that in cases when optical contrast in exposure is high when an image plane is superimposed, a multiple exposure method be used, whereas in cases when optical contrast is low, a multiple patterning method be used.

As illustrated in FIGS. 4A to 4F, resists for use in exposure are classified into a positive-type and a negative-type, either of which may be selected according to an exposure method.

In the invention, the obtained pattern shape and pattern pitch vary depending on the method of shift exposure, the type of a resist, and a combination of transmitting portions and making portions in a mask. When double exposure of a negative-type resist is performed by using a mask having opening portions 21 in the form of a grid, which is illustrated in FIG. 2A, a hole pattern, as illustrated in FIG. 4E, is obtained. When double exposure of a positive-type resist is performed, a dot pattern, as illustrated in FIG. 4F, is obtained.

FIGS. 5A to 5F are process diagrams of a case when double exposure is performed in the same way as in FIGS. 4A to 4F, by using a mask illustrated in FIG. 2B. Reference characters in FIGS. 5A to 5F are similar to those in FIGS. 4A to 4F. First, as illustrated in FIG. 5A, the substrate 40 coated with the resist 41 is manufactured, and first exposure is performed, as illustrated in FIG. 4B, to form the first exposed areas 43a and the light-shielding area 42. Next, the mask is shifted in the X direction by P/2 and in the Y direction by P/2, and second exposure is performed, as illustrated in FIG. 4C. A grid exposed area 43 and the dot-shaped light-shielding areas 42 are finally obtained, as illustrated in FIG. 4D. When a negative-type resist is used as the resist 41, a dot pattern in which the holes 46 are arranged so as to obliquely intersect in the resist pattern 41a is obtained, as illustrated in FIG. 5E. When a positive-type resist is used as the resist 41, a dot pattern in which the dot-shaped resists 41b are arranged so as to obliquely intersect is obtained, as illustrated in FIG. 5F. In both cases, the pitch between adjacent holes or dots is $P/2^{1/2}$.

Figure 6A:
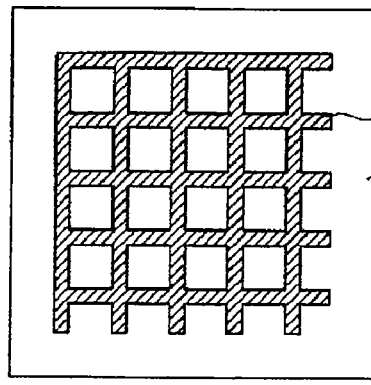
FIGS. 6A to 6F illustrate exposure processes of another embodiment of the invention.
Figure 6D:
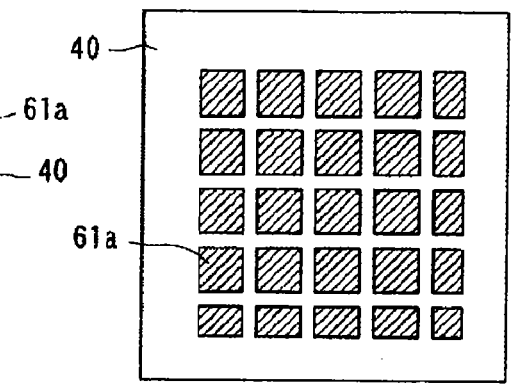
Figure 6B:
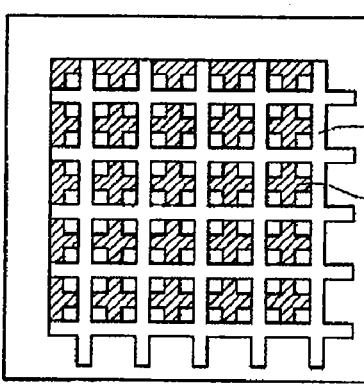
Figure 6E:
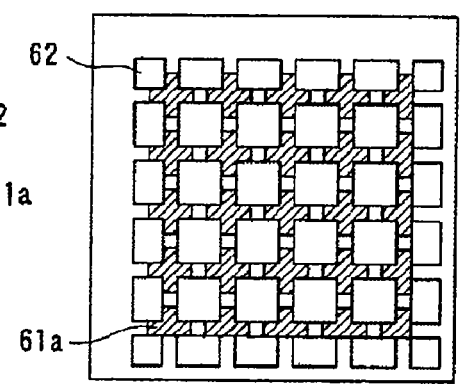
Figure 6C:
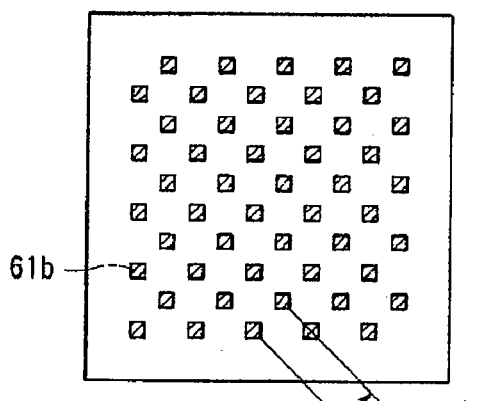
Figure 6F:
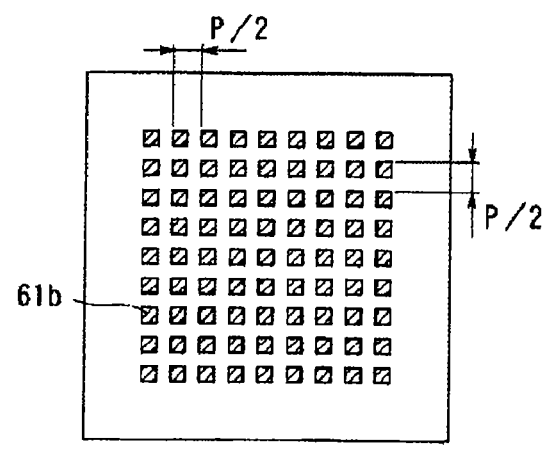

Further, FIGS. 6A to 6F are process diagrams of a case of double patterning by using the mask of FIG. 2A. FIGS. 6A to 6C illustrate a case of using a negative-type resist, and FIGS. 6D to 6F illustrate a case of using a positive-type resist. First, as illustrated in FIG. 4A, the resist 41 is applied onto the substrate 40, on which a base material of a structure is deposited, first exposure is performed by using a mask of FIG. 2A, development is performed, etching is performed, and then, the resist 41 is stripped. Thus, in the case of a negative-type resist, a grid first pattern 61a (FIG. 6A) is obtained, and in the case of a positive-type resist, a dot-shaped first pattern 61a (FIG. 6D) is obtained. Next, in the same way as illustrated in FIG. 4A, a resist is applied in the same range as the first resist 41, the mask is shifted in each of the X and Y directions by P/2, and second exposure and development are performed, thereby obtaining a resist 62 with a given pattern (FIGS. 6B and 6E). After etching of the base material of the structure with the resist 62 functioning as a mask, the resist is stripped to obtain a given pattern. At this point, in the case of a negative-type resist, a pattern is formed of portions of the area 62, which has been exposed and developed in the second exposure, in the area 61a has been formed in a pattern in the first exposure. Accordingly, as with the pattern in FIG. 5F, a dot pattern, in which dots 61b are arranged so as to obliquely intersect at a pitch of $P/2^{1/2}$ is obtained (FIG. 6C). On the other hand, in the case of a positive-type resist, the areas 61a that have been formed in a pattern in the first exposure are patterned with the areas 62, which are shielded from light in the second exposure. Accordingly, as with the pattern in FIG. 4F, a dot pattern (FIG. 6F) in which the dots 61b are arranged in a two-dimensional period at a pitch of P/2 is obtained.

Note that in cases when exposure is performed twice by using the mask of FIG. 2B, if a negative-type resist is used, this is similar to cases when exposure is performed twice by using the mask of FIG. 2A and a positive-type resist, and, therefore, its processes are similar to those illustrated in FIGS. 6D to 6F. In cases when exposure is performed twice by using the mask of FIG. 2B, if a positive-type resist is used, this is similar to cases when exposure is performed twice by using the mask of FIG. 2A and a negative-type resist, and, therefore, its processes are similar to those illustrated in FIGS. 6A to 6C. The relationship among obtained pattern shapes and pattern pitches between the opening shapes of masks and exposure methods and their resist types are represented in Table 1.

TABLE 1

| | Exposure method | | | |
|---|---|---|---|---|
| | Multiple exposure method | | Multiple Patterning method | |
| Type of resist | Negative type | Positive type | Negative type | Positive type |
| Grid opening portion FIG. 2A | Hole pattern P/2 | Dot pattern P/2 | Dot pattern $P/2^{1/2}$ | Dot pattern P/2 |
| Grid light-shielding portion FIG. 2B | Hole pattern $P/2^{1/2}$ | Dot pattern $P/2^{1/2}$ | Dot pattern P/2 | Dot pattern $P/2^{1/2}$ |

Figure 7A:
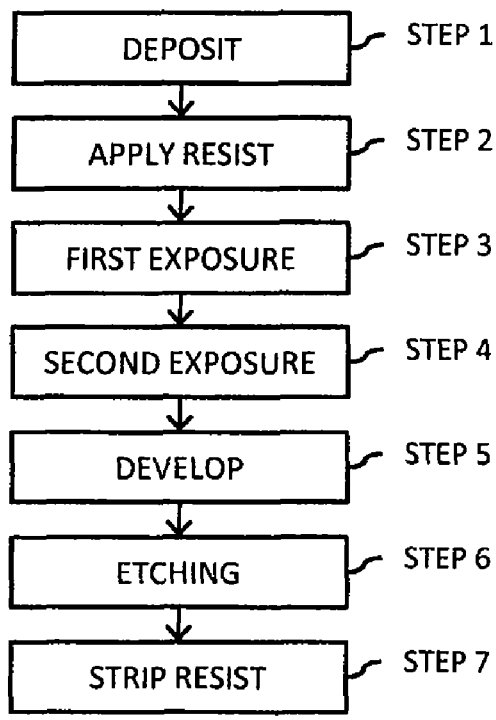
FIGS. 7A to 7B are flowcharts of a method of manufacturing a two-dimensional periodic structure using the invention.

Next, a method of manufacturing a two-dimensional periodic structure using a pattern forming method of the invention is described with reference to FIGS. 7A and 7B. FIG. 7A is a flowchart of manufacturing a substrate having a two-dimensional periodic structure using a double exposure method. In step 1, a base material of a structure is deposited on a substrate. In step 2, a resist is applied onto the substrate, and appropriate baking, and so on, are performed. In step 3, first exposure is performed using the exposure device 20, so that a two-dimensional periodic optical image is exposed on the resist. In step 4, after a stage is shifted to a desired position, second exposure is performed using the exposure device 20 to expose the two-dimensional periodic optical image on the resist. In step 5, the resist is developed. In step 6, etching is performed by using the resist as a mask to process the base material deposited on the substrate into a two-dimensional periodic structure. In step 7, the resist, which has become unnecessary, is removed. Such a flow allows a substrate having a two-dimensional periodic structure to be manufactured.

Figure 7B:
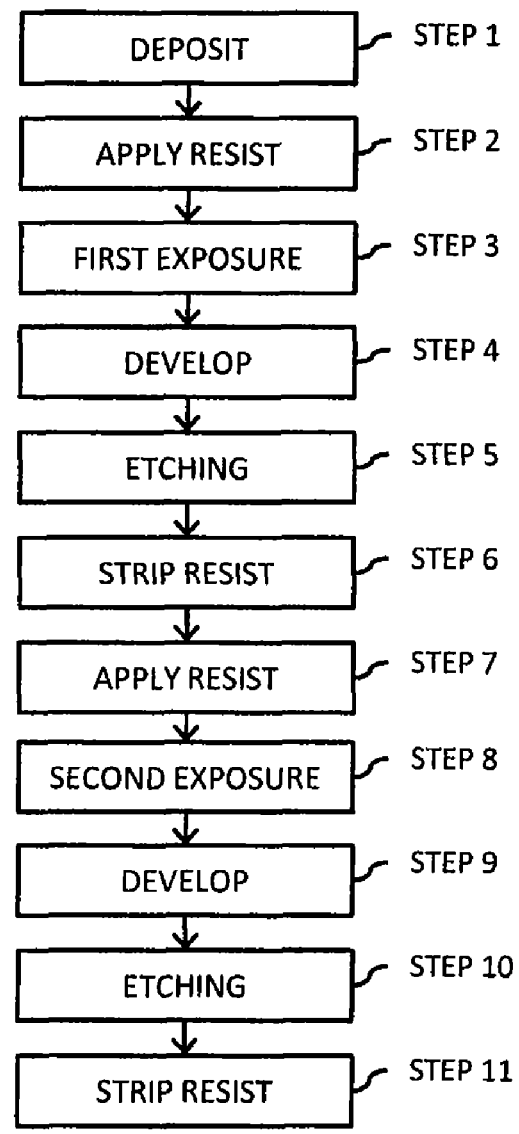

Next, a flowchart of manufacturing a substrate having a two-dimensional periodic structure using a double patterning method is illustrated in FIG. 7B. In step 1, a base material of a structure is deposited on a substrate. In step 2, a resist is applied onto the substrate, and appropriate baking, and so on, are performed. In step 3, first exposure is performed using the exposure device 20, so that a two-dimensional periodic optical image is exposed on the resist. In step 4, the resist is developed. In step 5, etching is performed by using the resist as a mask to process the base material deposited on the substrate. In step 6, the resist, which has become unnecessary, is removed. In step 7, a resist is applied again onto the substrate, and appropriate baking, and so on, are performed. In step 8, after a stage is shifted to a desired position, second exposure is performed using the exposure device 20 to expose the two-dimensional periodic optical image on the resist. In step 9, the resist is developed. In step 10, etching is performed by using the resist as a mask to process the base material deposited on the substrate into a two-dimensional periodic structure. In step 11, the resist, which has become unnecessary, is removed.

Using a pattern forming method of the invention enables a fine, two-dimensional periodic pattern, which has been difficult to manufacture, to be manufactured with one modified illumination and one mask, and, therefore, illumination replacement and mask replacement are not required. This has advantages, such as high alignment accuracy and tact saving. Accordingly, a high performance device utilizing a two-dimensional periodic structure can be manufactured with high quality.

EXAMPLES

Example 1

Using quadrupole illumination as illustrated in FIG. 3D and a mask having the opening portions 21 in lines illustrated in FIG. 2A, double exposure was performed according to the processes shown in FIGS. 4A to 4F. The mask is in the form of a grid with a pattern pitch of $Px=Py=P=6$ μm, and the width of a line is $tx=ty=1.5$ μm. Assuming that the X direction was 0°, light-transmission portions of a stop of illumination were placed at a position of $\theta=45°$ and the subsequent positions such that all the positions were apart from one another by 90°. As the exposure device, an exposure device of a projection optical type in which the NA of a projection optical system was 0.083 and the wavelength of a light source used for exposure was 0.393 μm was used.

The positive-type resist 41 was applied onto the substrate 40 (FIG. 4A). Next, a pattern image of a mask was transferred onto the resist 41 by exposure with a given Dose D11 (first exposure). As a result, areas 43a corresponding to the opening portions 21 of the mask were exposed (FIG. 4B). Next, a substrate stage was moved in the X direction by 3 μm and in the Y direction by 3 μm, to shift the position of the mask relative to the resist 41 in each of the X direction and the Y direction by P/2, and second exposure was performed with a given appropriate Dose D12 (FIG. 4C). As a result, new areas 43B corresponding to the opening portions 21 of the mask were exposed.

Then, development was performed with an alkali developer to remove the areas 43 exposed in the first exposure and in the second exposure. As a result, a dot pattern in which a dot-shaped resist was arranged in a two-dimensional period at pitches of $P=3$ μm in the X and Y directions was obtained. Using exposure processes with the same mask and the same illumination made it possible to provide processes of two-dimensional period patterning with high alignment accuracy and tact saving.

Example 2

Figure 8A:
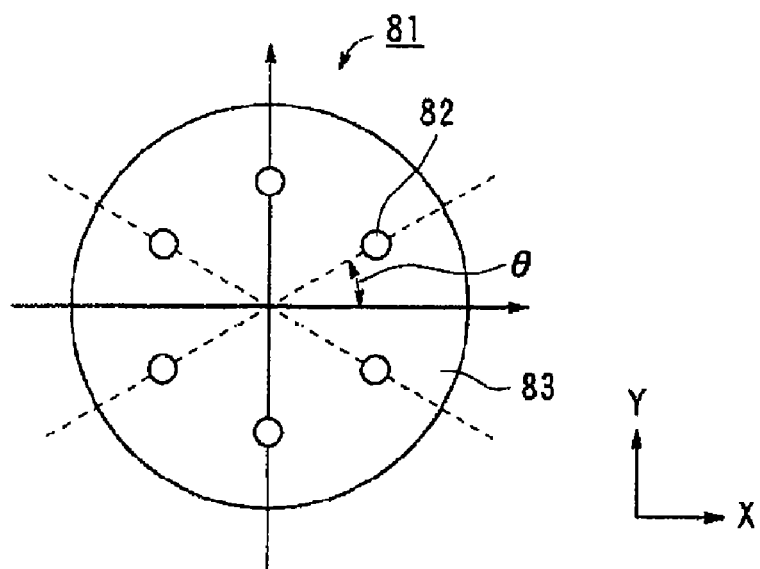
FIGS. 8A and 8B illustrate a mask and illumination used in an example of the invention.
Figure 8B:
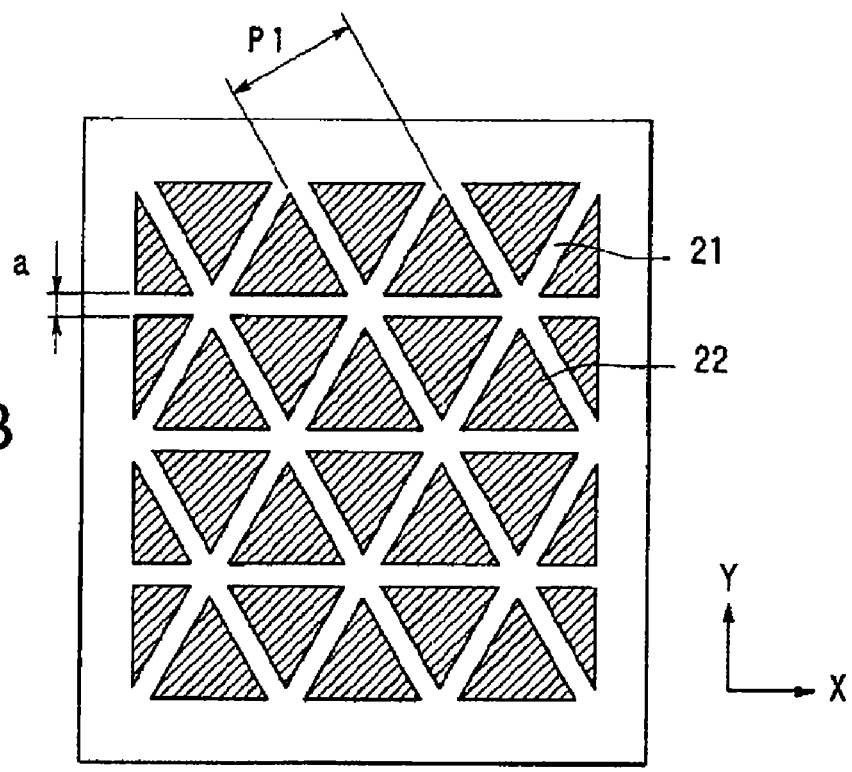

Using hexapole illumination and a mask illustrated in FIG. 8B, triple exposure of a positive-type resist was performed to form a dot pattern. FIG. 8A is a schematic plan view of a stop 81 of the hexapole illumination used in this example. The stop 81 has light-transmission portions 82 that are made of six circles and has a transmittance of one, and a light shielding portion 83 that has a transmittance of zero. The light-transmission portions 82 were placed at a position of $\theta=30°$ from the X direction and at the subsequent positions, such that all the positions were apart from one another by 60°.

The mask has a pattern in which line patterns having opening portions in lines with a line width of $a=2$ μm arranged in parallel at a pitch of $P1=9$ μm are arranged in a mesh, such that the line patterns intersect one another at 60° in three directions. The radial grid portions are the opening portions 21, and a triangular dot pattern is made up of the light-shielding portions 22.

Also, in this example, as the exposure device, a device in which the NA of a projection optical system was 0.083 and the wavelength of a light source used for exposure was 0.393 μm was used.

Figure 9A:
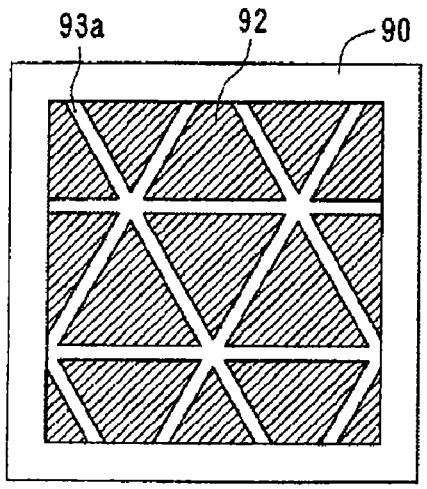
FIGS. 9A to 9E are process views of an example of the invention.
Figure 9B:
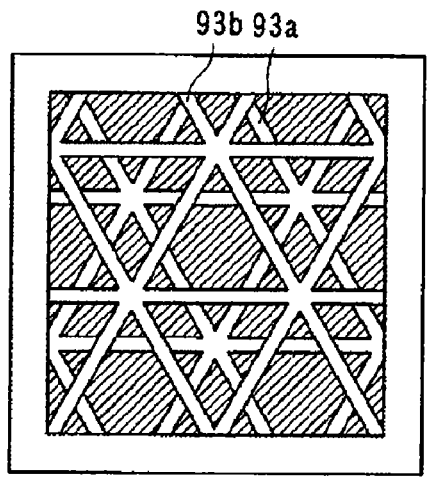
Figure 9C:
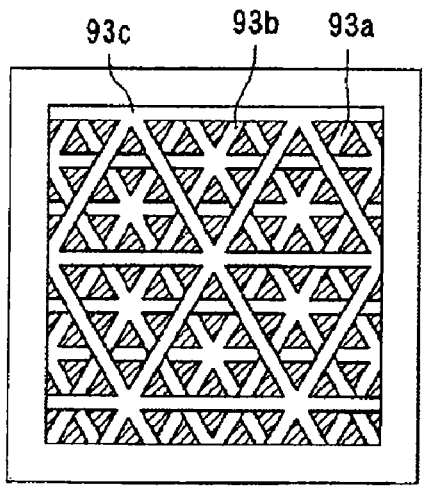
Figure 9D:
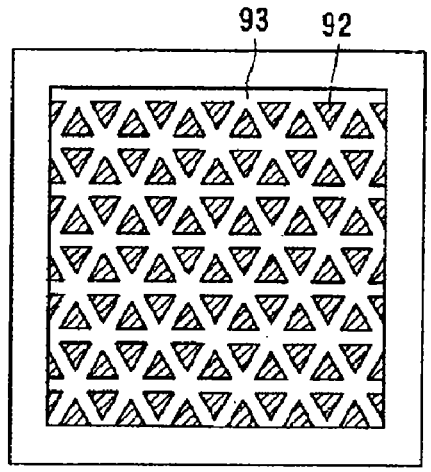

Next, with reference to FIGS. 9A to 9E, processes of forming a dot pattern in this example are described. First, a resist (not illustrated) was applied onto a substrate 90, and first exposure of the resist was performed by using the mask of FIG. 8B with a given Dose D21. As a result, areas 93a corresponding to the opening portions 21 of the mask were exposed (FIG. 9A). Next, the mask was moved, and second exposure was performed with a given Dose D22, so that new areas 93b were exposed (FIG. 9B). The amount of movement of the mask from the first exposure to the second exposure was $2P/3=6$ μm in a direction perpendicular to any line. The movement direction was, for example, in FIGS. 9A to 9E, any one of 30°, 90° and 150°, assuming that the horizontal direction of the page space is 0°. Further, after the second exposure process, the mask was moved in the above direction by $2P/3=6$ μm (third position), and third exposure was performed with a given Dose D23, so that new areas 93c were exposed (FIG. 9C). As such, the areas 93a, 93b and 93c were obtained as exposed areas 93, and areas 92, which had not been exposed in all the exposure processes were left (FIG. 9D).

Figure 9E:
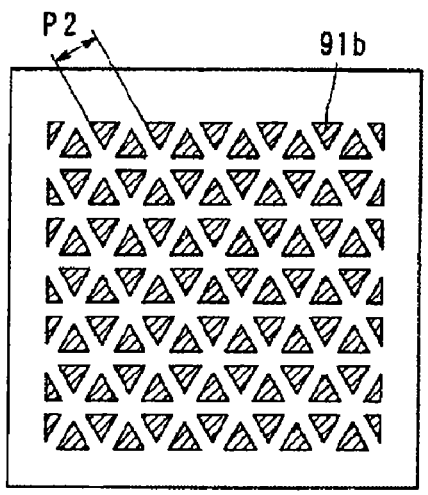

Then, the exposed areas 93 were removed by the development with an alkali developer, so that a dot pattern in which triangular, dot-shaped resists 91b were arranged at a pitch of $P2=3$ μm (i.e., P1/3) in a two-dimensional period was obtained (FIG. 9E). Using exposure processes with the same mask and the same illumination in this way made it possible to provide processes of two-dimensional periodic patterning with high alignment accuracy and tact saving.

Example 3

Figure 10A:
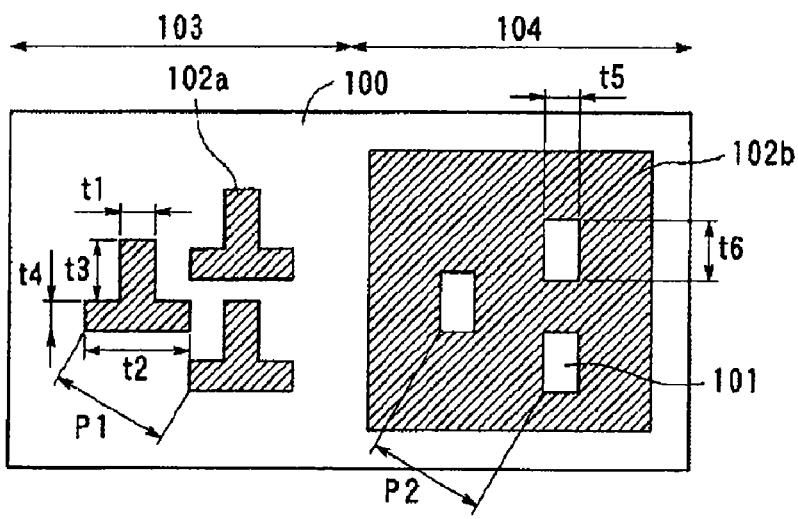
FIGS. 10A to 10E illustrate a mask used in an example of the invention and related processes.

Using a mask illustrated in FIG. 10A and the hexapole illumination used in Example 2, double exposure of a positive-type resist was performed, so that a dot pattern with oblique intersections was formed. A mask 100 has a first area 103, in which protruding light-shielding portions 102a are arranged, so as to obliquely intersect and a second area 104, in which quadrangular opening portions 101 are arranged, so as to obliquely intersect. In both areas, pitches have the same value P1=P2=5.2 μm. In the light-shielding portions 102a, t1=1.5 μm, t2=4.5 μm, t3=2.6 μm, and t4=1.3 μm. In the opening portions 101, t5=1.5 μm, and t6=2.6 μm.

Also, in this example, as the exposure device, a device, in which the NA of a projection optical system was 0.083 and the wavelength of a light source used for exposure was 0.393 μm, was used.

Figure 10B:
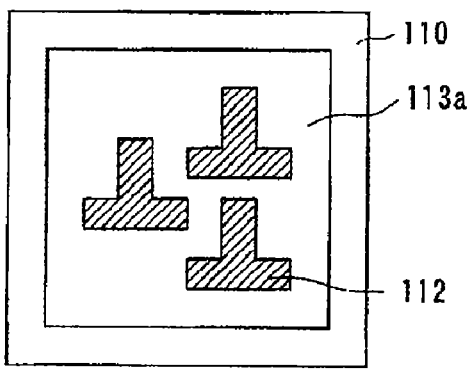
Figure 10C:
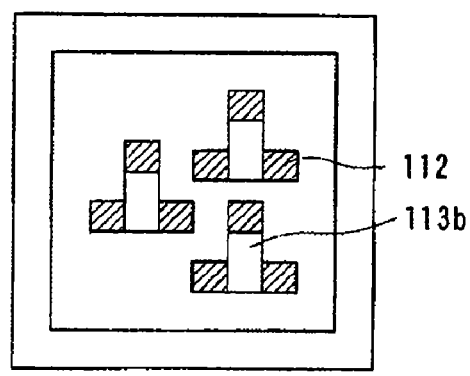
Figure 10D:
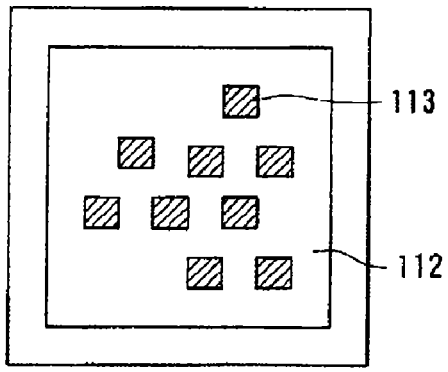
Figure 10E:
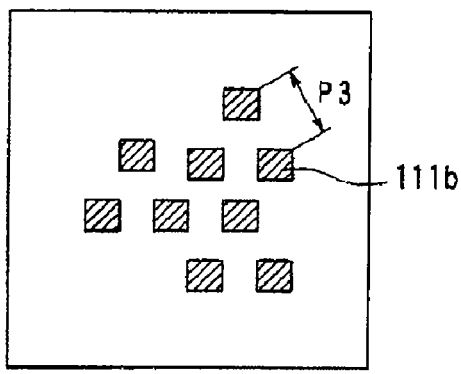

Next, with reference to FIGS. 10B and 10E, processes of forming a dot pattern in this example are described. First, a positive-type resist was applied onto a substrate 110, and pattern images in the first area 103 of the mask 100 were exposed and transferred with a given Dose D31 (first exposure). As a result, the area other than the protruding light-shielding portions 102a was exposed (FIG. 10B). Further, the mask 100 was moved so as to be arranged such that the exposed areas 112 in the first exposure were overlapped with the opening portions 101 of the second area 104, and pattern images were exposed and transferred with a give Dose D32 (second exposure). As a result, the areas of the opening portions 101 were exposed (FIG. 10C), so that an exposed area 113a of the first exposure and exposed areas 113b of the second exposure became the exposed areas 112, whereas dot-shaped light-shielding areas 113 were left.

Then, the exposed areas 112 were removed by development with an alkali developer, so that a dot pattern, in which dot-shaped resist 111b were arranged at a pitch of P3=3 μm in a two-dimensional period, was obtained. Using exposure processes in this way made it possible to provide processes of two-dimensional periodic patterning with high alignment accuracy and tact saving.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of forming a pattern with dots or holes arranged in a two-dimensional period by illuminating, with illumination light, a mask having a light-shielding portion pattern on a translucent substrate, and performing projection and exposure of an object to be exposed through a projection optical system, the illumination light being an effective light source of multipole illumination, and the method comprising the steps of:
    performing a first exposure process with the mask placed at a first position relative to the object to be exposed;
    performing a second exposure process with the mask placed at a second position different from the first position relative to the object to be exposed, wherein the mask has line patterns having lines with a line width a [m] arranged in parallel at a pitch of P, the line patterns being arranged in a mesh such that the line patterns intersect one another at 60° in three directions, and the illumination light is an effective light source of hexapole illumination, and the second exposure process is performed, after the first exposure process, with the mask placed at a second position displaced from the first position by 2P/3 [m] in a direction perpendicular to any line of the line patterns; and
    performing a third exposure process, after the second exposure process, with the mask placed at a third position further displaced from the second position by 2P/3 [m] in the direction, to thereby form a dot pattern in a two-dimensional period having a pitch of P/3 [m].

2. The pattern forming method according to claim 1, wherein the line patterns are opening portion patterns.

3. A method of forming a pattern with dots or holes arranged in a two-dimensional period by illuminating, with illumination light, a mask having a light-shielding portion pattern on a translucent substrate, and performing projection and exposure of an object to be exposed through a projection optical system, the illumination light being an effective light source of multipole illumination, and the method comprising the steps of:
    performing a first exposure process with the mask placed at a first position relative to the object to be exposed; and
    performing a second exposure process with the mask placed at a second position different from the first position relative to the object to be exposed,
    wherein the mask has a first area having light-shielding portions arranged at a pitch of P [m] so as to obliquely intersect, and a second area having opening portions arranged at the pitch of P [m] so as to obliquely intersect,
    the illumination light is an effective light source of hexapole illumination,
    in the first exposure process, exposure is performed using the first area of the mask, and
    in the second exposure process, exposure is performed with the second area of the mask arranged such that the light-shielding portions in the first exposure process are overlapped with the opening portions of the second area.

* * * * *